UNITED STATES PATENT OFFICE.

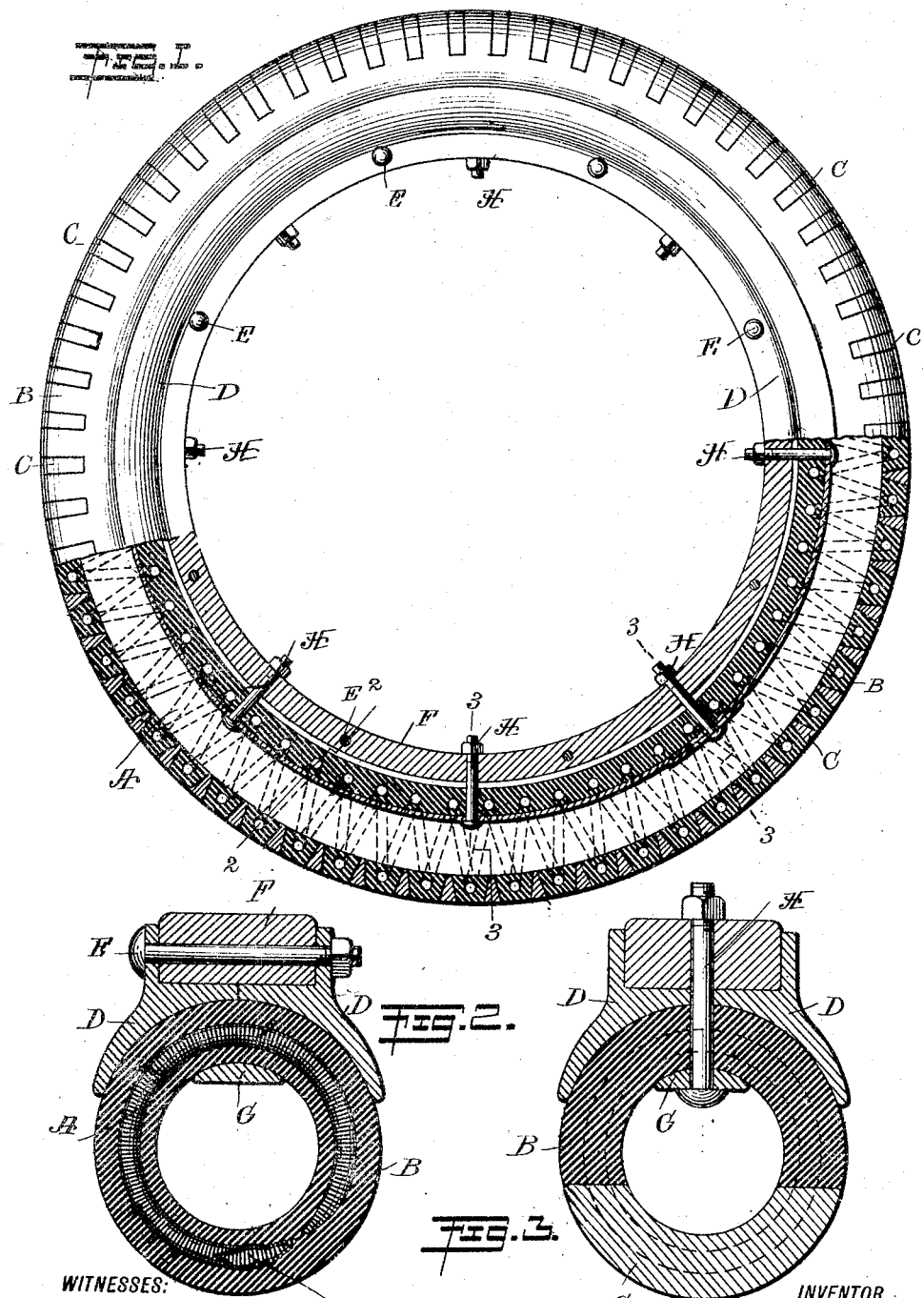

JOHN F. BOSQUETT, OF JERSEY CITY, NEW JERSEY.

VEHICLE-TIRE.

1,025,734.  Specification of Letters Patent.  Patented May 7, 1912.

Application filed April 11, 1911. Serial No. 620,311.

*To all whom it may concern:*

Be it known that I, JOHN F. BOSQUETT, a citizen of the United States, and a resident of Jersey City, in the county of Hudson and State of New Jersey, have invented a new and Improved Vehicle-Tire, of which the following is a full, clear, and exact description.

The object of the invention is to provide a new and improved vehicle tire, more especially designed for use on the wheels of automobiles and other vehicles, and arranged to provide the desired resiliency without the use of inflatable members to render the tire puncture-proof and to prevent the vehicle from skidding on slippery roadways.

For the purpose mentioned, use is made of a spiral spring coiled into spiral shape and bent into annular form, and embedded in a flexible material, with tread blocks of a hard substance, such as emery, carborundum, or the like, inserted between the convolutions of the spiral spring, and embedded in the flexible material.

A practical embodiment of the invention is represented in the accompanying drawings forming a part of this specification, in which similar characters of reference indicate corresponding parts in all the views.

Figure 1 is a face view of the vehicle tire, part being in section; Fig. 2 is an enlarged cross section of the same on the line 2—2 of Fig. 1; and Fig. 3 is a similar view of the same on the line 3—3 of Fig. 1.

A spiral spring A is coiled into spiral shape and bent into annular form, and its convolutions are embedded in a tube B, of rubber or other suitable flexible material, and in the peripheral portion of this tube B and between adjacent convolutions of the spring A are arrangd tread blocks C, of a hard substance, preferably emery, carborundum, or the like, the blocks C being segmental and tapering, so that the sides thereof are approximately parallel with the adjacent convolutions of the spring A, as will be readily understood by reference to Fig. 1. The inner portion of the tube B is seated on segmental flanges D fastened by transverse bolts E to the vehicle rim F, and inside of the tube B is arranged a ring G engaged by radial bolts H extending through the tube B and between the convolutions of the spring A, through the joints of the flanges D and through the rim F to securely fasten or hold the tire in position on the rim F of the wheel.

By the arrangement described, the desired resiliency is given to the tire by the use of the spiral spring A, and by providing the tread of the vehicle tire with the spaced tread blocks C of hard material, it is evident that long life of the vehicle tire is insured, and by alternating the rubber of the tube B with the tread blocks C, the vehicle on which the wheel is used is prevented from skidding on slippery roadways.

The vehicle tire shown and described is very simple and durable in construction, and does not depend on inflatable members, and hence is not liable to be easily injured.

Having thus described my invention, I claim as new and desire to secure by Letters Patent:

A vehicle tire, comprising a spring coiled to form spaced convolutions and bent into an annular shape, a tube in which the spring is embedded, and tread blocks embedded transversely in the peripheral portion of the tube between adjacent convolutions.

In testimony whereof I have signed my name to this specification in the presence of two subscribing witnesses.

JOHN F. BOSQUETT.

Witnesses:
THEO. G. HOSTER,
PHILIP D. ROLLHAUS.